United States Patent [19]

Mullins et al.

[11] Patent Number: 5,438,237

[45] Date of Patent: Aug. 1, 1995

[54] AUTOMATIC DAYTIME RUNNING LIGHT SYSTEM

[75] Inventors: Patrick S. Mullins; Victor C. Cordiano; Charles E. Benedict, all of Tallahassee, Fla.

[73] Assignee: Autosmart Light Switches, Inc., Tallahassee, Fla.

[21] Appl. No.: 161,479

[22] Filed: Dec. 6, 1993

[51] Int. Cl.[6] .............................................. B60Q 1/02
[52] U.S. Cl. ...................................... 315/82; 315/77; 315/78; 315/80
[58] Field of Search ................................. 315/77–80, 315/82, 83; 307/10.1, 10.8

[56] References Cited

U.S. PATENT DOCUMENTS

| | | | |
|---|---|---|---|
| 3,391,301 | 9/1966 | Poznik | 315/83 |
| 3,832,597 | 8/1974 | Mitchell | 315/82 |
| 3,932,788 | 1/1976 | Groover | 315/82 X |
| 4,667,129 | 5/1987 | Papillon | 315/82 |
| 4,684,819 | 8/1987 | Haag et al. | 315/82 X |
| 4,686,423 | 8/1987 | Eydt | 315/82 |
| 4,723,095 | 2/1988 | Svazas et al. | 315/82 |
| 4,728,861 | 3/1988 | Kurihara et al. | 315/82 X |
| 4,831,310 | 5/1989 | Heintzberger et al. | 315/77 |
| 4,841,199 | 6/1989 | Irie | 315/83 |
| 4,899,083 | 2/1990 | Kataoka et al. | 315/77 |
| 4,983,883 | 1/1991 | Roland | 315/77 |
| 5,030,884 | 7/1991 | Roussey et al. | 315/83 |
| 5,075,593 | 12/1991 | Shoda | 315/82 |

OTHER PUBLICATIONS

TMOS Power MOSFET 1992 Selector Guide and Cross Reference SG56/D REV12 Motorola, cover page, pp. 1, 2, 3 and 4.

*Primary Examiner*—Robert J. Pascal
*Assistant Examiner*—Haissa Philogene
*Attorney, Agent, or Firm*—Dowell & Dowell

[57] ABSTRACT

An automatic daytime running light system for a vehicle having an engine, an electric power source, a starter motor circuit for the engine, external running lights including headlights and parking lights, and input switches for ignition circuit and the external running lights, the system being responsive to the input switches and starter motor circuit to automatically control the operation of the external running lights, and the system including digital logic timer circuit means for automatically controlling the operation of the external running lights, and MOSFET output switching devices, which thereby provide high reliability and safety, redundant circuitry to thereby provide a higher level of reliability and fail-safe operation of the system, and MOSFET fault current monitoring circuitry which monitors the drain to source fault currents of the MOSFET output switch means, whereby upon detection of fault currents, the digital logic timer controls a fault current indicator to provide an indication of a fault current condition.

24 Claims, 6 Drawing Sheets

AUTOMATIC DAYTIME RUNNING LIGHT SYSTEM

FIELD OF THE INVENTION

This invention relates to a fully electronic automatic daytime running light system for automatically controlling the operation of the external running lights of a vehicle, headlights and parking lights, in response to ignition actuation and to maintain activation of these lights for a predetermined time period from time of ignition switch deactivation, and to extinguish the external running lights during vehicle starter motor activity.

BACKGROUND OF THE INVENTION

Energization of the external running lights of a vehicle during ignition activation and engine operation is a safety measure. In some countries, it is the law that all new vehicles automatically have their headlights on while the ignition is on, and it would appear that the general trend of Government regulations in many countries will be to require daytime running light systems on automotive vehicles, both trucks and cars, and while certain Government regulations are presently addressed to newly manufactured vehicles, the possibility of retrofitting vehicles already in services is a consideration in the implementation of a daytime running light circuit system.

Studies have shown that the number of motor vehicle accidents can be substantially lowered if vehicles have their headlights and parking lights illuminated whenever the vehicles are operated, and in the future, insurance companies may require implementation of a daytime running light system for all insured motor vehicles.

Systems for causing activation of the external running lights while the ignition is turned on and the vehicle engine is running have been known in the prior art. For example, Haag et al. U.S. Pat. No. 4,684,819 discloses that the high beam headlights are energized at a reduced intensity in response to a predetermined vehicle operating condition. Kataoka et al. U.S. Pat. No. 4,899,083 discloses a bypass circuit bypassing a manual lighting switch, and during operation in an automatic lighting mode, the head lamps and a clearance lamp of the automobile automatically turn on when the engine operation becomes stable upon completion of start-up operation by the provision of a delay circuit which is used to open or close the bypass circuit. Eydt U.S. Pat. No. 4,686,423 provides an automotive headlight control including means to detect when the automobile engine is operating and cause the headlights to be operated at reduced output. Heintzberger et al. U.S. Pat. No. 4,831,310 provides an automatic headlight control system for causing the headlights of a motor vehicle to be actuated when the vehicle is running based on comparing an AC signal from the alternator to the DC signal from the battery and actuating the lights at a predetermined value. Papillon U.S. Pat. No. 4,667,129 discloses a method and device for automatically switching on and off the headlights of a motor vehicle, which takes into consideration the amplitude of the direct current voltage between the positive and negative terminals of the vehicle's battery, for the purpose of protecting both the battery and the headlights.

None of the above-identified prior art systems for automatically turning on and off the headlights and external running lights of a motor vehicle provide a high level of reliability and fail-safe operation, which is accomplished by the present invention.

Consequently, the need exists for improvements in automatic vehicle lighting systems which will result in greater reliability and safety, and to insure fail-safe operation.

SUMMARY OF THE INVENTION

An object of the present invention is, therefore, to provide an automatic daytime running light system for a vehicle having an engine, an electric power source, a starter motor circuit for said engine, external running lights including headlights and parking lights, and input switches for ignition circuit and the external running lights, such system being responsive to the input switches and starter motor circuit to automatically control the operation of the external running lights, such system comprising: digital logic timer integrated circuit means for automatically controlling the operation of the external running lights to activate the lights in response to ignition actuation, and to maintain activation of the lights for a predetermined time period from time of ignition switch deactivation; and electronic MOSFET output switching means connected between the external running lights and the digital logic timer circuit, to thereby provide a high level of reliability and safety.

Another object of the present invention system incorporating the afore-mentioned digital logic timer circuit is to control deactivation of the external running lights during starter motor activity of the vehicle.

Still another object of the present invention system is to provide redundant (components) circuit means connected between the ignition circuit and the external running lights, and connected in parallel with the digital logic timer and the electronic MOSFET output switching means, to insure that any component failure will not cause system inoperativeness, and to thereby provide a high level of reliability and fail-safe operation of the inventive system.

It is yet another object of the present invention to provide a fault current indicator which is controlled by the digital logic timer integrated circuit, and MOSFET fault current monitoring means within the digital logic timer for monitoring drain to source fault currents of the before-mentioned electronic MOSFET output switching devices, whereby upon detection of such fault currents the digital logic timer controls the fault current indicator to provide an indication of a fault current condition. Furthermore, upon detection of such fault currents, the digital logic timer controls the gate of the MOSFET output switching device to intermittently flash the external running lights to further provide an indication of a fault current condition.

It is still yet another object of the present invention system to provide a manual switch connected between ground and the input of the digital logic timer circuit, which when actuated by an operator of the vehicle will disable the operation of the present invention system and extinguish the external running lights. This additional feature of the present invention is advantageous in military and public service/utility applications, which may require that the vehicle engine remain in a running condition without activation or energization of the external running lights.

It is yet still another object of the present invention system to provide an automatic daytime running light system which includes separate circuit control means and redundant components circuit means provided therefor for separately controlling the activation and deactivation of the headlights and parking lights of the vehicle, to thereby provide an even higher level of reliability and fail-safe operation of the system invention.

BRIEF DESCRIPTION OF THE DRAWINGS

The objects, advantages and other features of the present invention system will become more apparent upon reading of the following non-restrictive description of a preferred embodiment thereof, given for the purpose of exemplification only with reference to the accompanying drawings, in which.

DETAILED DESCRIPTION OF THE INVENTION

Figure 1:
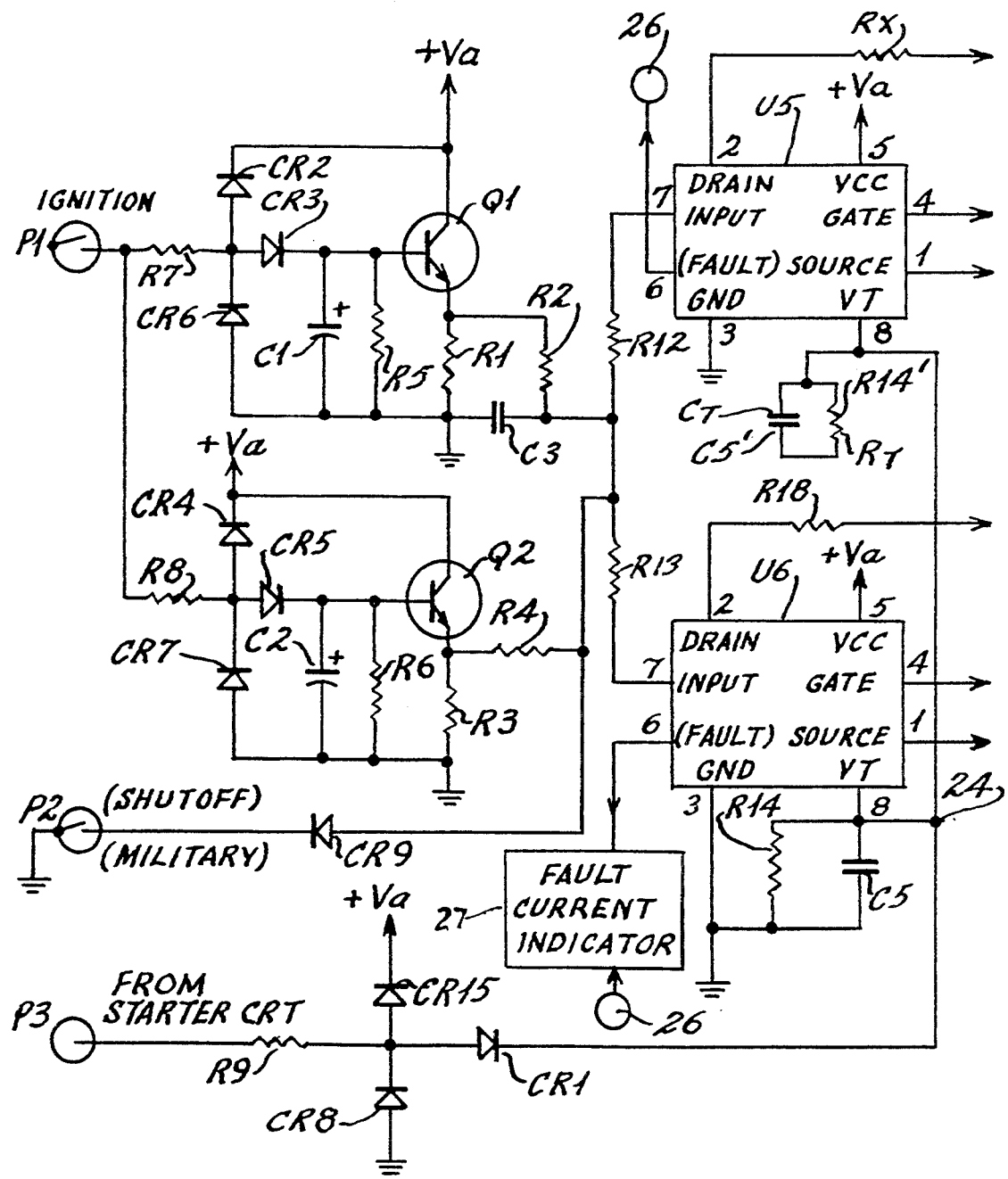
FIGS. 1 and 1A are a combined schematic and block diagram circuit drawing of the system invention showing the circuit interconnections of one embodiment of the system components with the ignition circuit, starter motor circuit, and the external running lights (headlamps & parking/running lamps) of a vehicle.
Figure 1A:
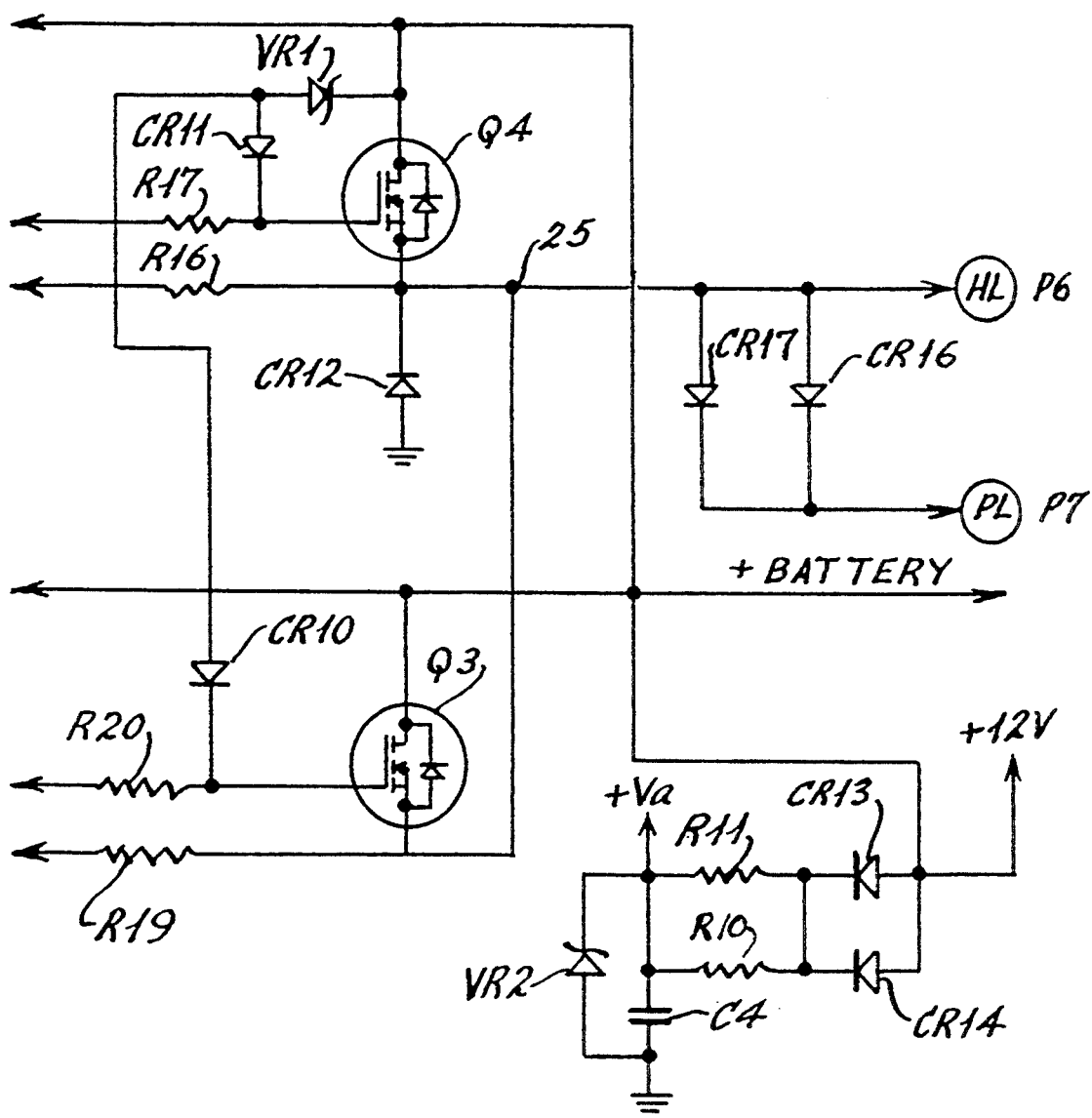

As illustrated in FIG. 1 and 1A, one embodiment of the system invention is connected between the ignition circuit P1 and the external running lights which comprise headlamps HL and parking/running lamps PL, and is also connected to the vehicle starter motor circuit at P3. The digital logic timer circuits of U5 and U6 are powered from a regulated, filtered and limited power supply comprising CR13, CR14, R10, R11, C4 and VR2, which provides the +Va voltage input at VCC. The automatic daytime running light system invention is also connected to the positive side of the vehicle battery as shown in FIG. 1A.

Trigger timer circuit means Q1 and its related circuitry is connected between the ignition circuit P1 and input pin 7 of digital logic timer means U5. The gate and source outputs of U5 are connected, respectively, to the gate and source of electronic MOSFET output switching device means Q4 which controls the application of power to the external running lights HL and PL. The ignition input P1 provides voltage to trigger timer circuit Q1 which provides an input control signal to U5 via input pin 7. The trigger timer circuit current path is through resistor R7 and diode CR3, placing a voltage charge on capacitor C1 that is approximately one volt less than the vehicle operating voltage. Diode CR2 limits all positive voltage transients by clamping to the +Va limit which is set by zener diode VR2 of the regulated power supply, and diode CR6 limits all negative voltage transients by clamping to ground. Diode CR3 prevents discharging of the voltage stored in capacitor C1, as would otherwise occur through the ignition system when the ignition is switched off. The timer discharge path is limited to resistor R5 and the base current of transistor Q1, which acts as a buffer to provide adequate drive for U5. The emitter of Q1 provides a voltage of 0.7 v less than that present on timing capacitor C1. Resistor R1 acts as a bleeder to control Q1's thermal leakage current, and prevent the external running lights from falsely turning on. Resistor R2 is an isolating coupler for U5 and resistors 12 and 13 connect to U5 and U6, respectively. Capacitor C3 connected between the emitter of Q1 and the node connection between R12 and R13 suppresses switching noise that may otherwise be injected from the SHUTOFF input circuit which includes a manual switch means P2 connected between ground and input 7 of U5, and which is actuated by an operator of the vehicle to disable the operation of the invention system and extinguish the external running lights. This manual switch P2 is normally a momentary switch, and when actuated couples the ground connection through diode CR9 to shunt the voltage at the common node connection at the junction of resistors R12 and R13 and between U5 and U6, and thus turn off both U5 and U6. Transient protection for this shutoff input relies on its high impedance nature and the automotive type protection already integral to the high side driver circuits U5 and U6.

Input P3 from the vehicle starter motor circuit is connected to either the starter solenoid terminal (not shown) or at some appropriate point at the ignition switch (not shown). This current path occurs through resistor R9 and diode CR1 to pin 8 of both U5 and U6. Diode CR15 limits all positive voltage transients by clamping to the +Va limit which is set by zener diode VR2, and diode CR8 limits all negative voltage transients by clamping to ground. A positive voltage greater than +5 volts at the starter input P3 activates the fault current circuitry feature of each digital logic timer U5 and U6 and forces it to turn off. Diode CR1 prevents any external signal from interfering with the normal fault current operation of U5 or U6.

As further shown in FIGS. 1 and 1A, the starter input circuit from P3 is connected via CR1 to pin 8 of each digital logic timer U5, U6, the drain, gate and source input/outputs of each of these timers being respectively connected to electronic MOSFET output switching means Q4, Q3 which are automatically controlled to provide source of power to the external running lights HL and PL.

A fault current indicator is shown connected to the FAULT output of each digital logic timer U5 or U6, which indicator is controlled by either digital logic timer means to provide an indication of a fault current condition of either respective electronic MOSFET output switching means. A MOSFET fault current monitoring means is included within each digital logic timer for monitoring drain to source fault currents of a respective electronic MOSFET output switching means, whereby upon detection of such fault currents, the respective digital logic timer controls the fault current indicator to provide an indication of a fault current condition. A detailed description of the operation of the fault current monitoring means will be provided hereinafter.

With respect to the initial operation of the system invention, each digital logic timer and related MOSFET output switching means will be turned on with more than eight volts present at the ignition input, and the shutoff input is not grounded, and the starter input has less than five volts present. The digital logic timer function is armed within approximately 100 milliseconds from the application of ignition signal at P1, and will provide the timed period after ignition switch deactivation to maintain activation of the external running lights for a predetermined time period which is controlled by the C1/R5 circuit of Q1 or the C2/R6 circuit of Q2, and will be somewhat voltage dependent.

Accordingly, the operation of either trigger timer circuit means Q1 and digital logic timer U5, or second trigger timer circuit means Q2 and second digital logic timer means U6, automatically controls the operation of the external running lights to activate said lights in response to ignition actuation, and to maintain activation of said lights for a predetermined time period from time of ignition switch deactivation.

Fail-Safe Redundant System Feature

The system invention provides a high level of reliability and fail-safe operation with the provision of redundant circuit means comprising second trigger timer circuit means Q2 and second digital logic timer means U6 and second MOSFET output switching means Q3, connected between the ignition P1 input and the external running lights HL and PL, and further connected in parallel to first trigger timer circuit means Q1 and first digital logic timer means U5 and first electronic MOSFET output switching means Q4. These circuit components are interconnected in the system invention via the junction of resistors R12 and R13, the common connection 24 of U5 and U6, and the output connection 25 to the external running lights.

Provision of the above-described redundant circuit means insures that any component failure will not cause system inoperativeness and to thereby satisfy the long felt need in the field of the invention by providing a most advantageous fail-safe system.

MOSFET Fault Current Monitoring

Figure 2:
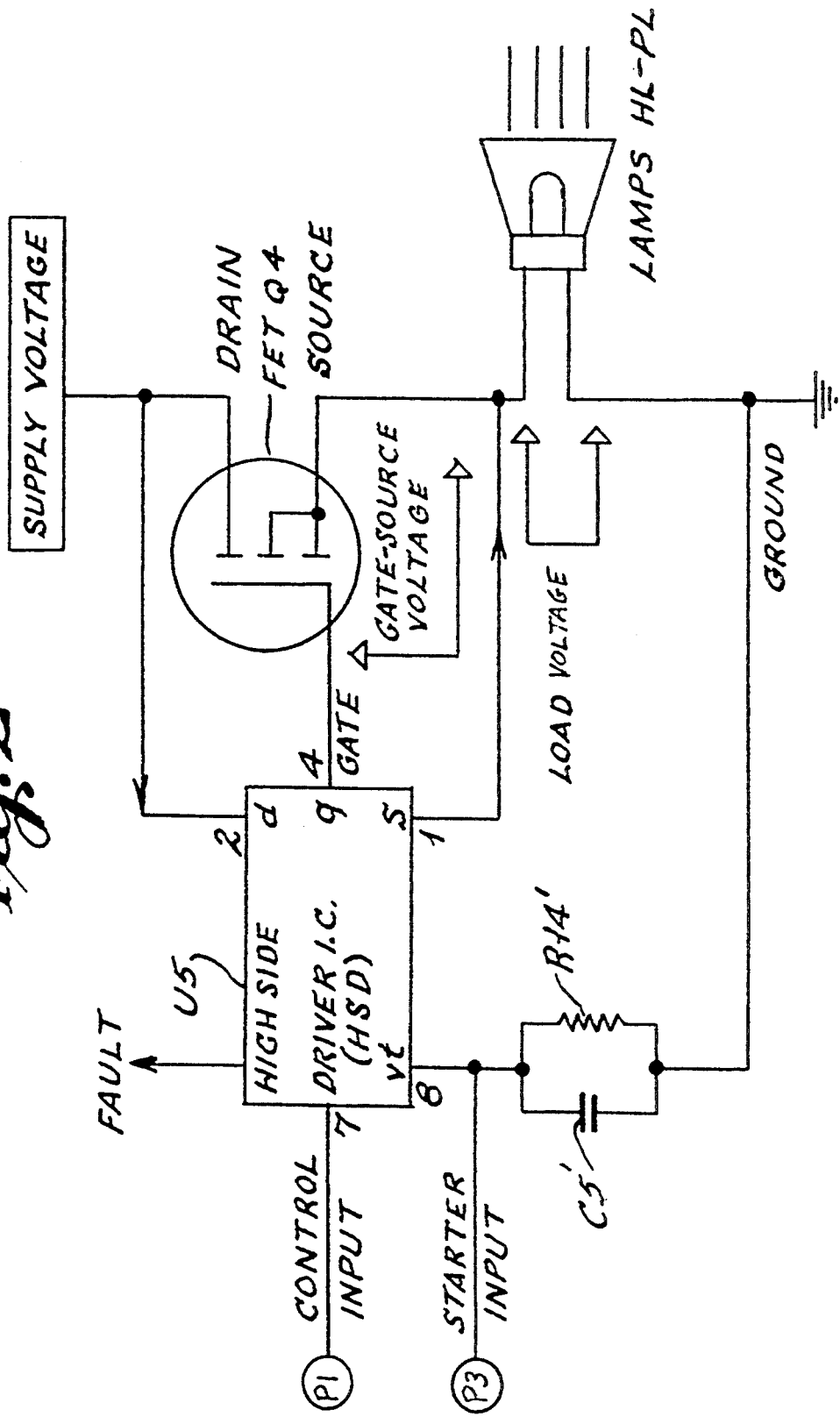
FIG. 2 is a simplified block schematic drawing showing the circuit interconnections of one digital logic timer I.C. U5 with one MOSFET output switch means Q4, which is exemplary of the circuit diagram for the other digital logic timer U6 and the other MOSFET switching means Q3.
Figure 3:
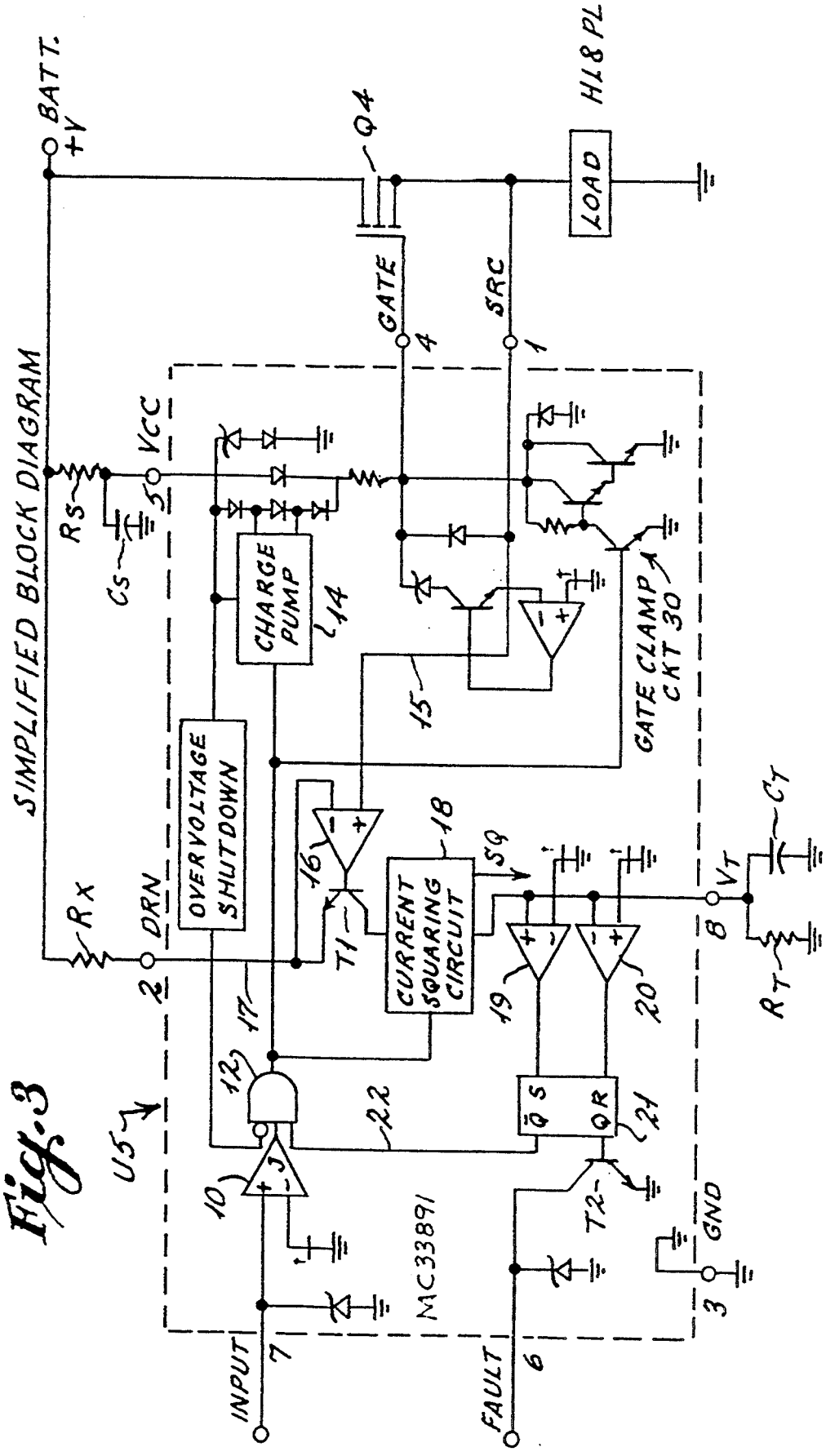
FIG. 3 is a simplified block diagram of one digital logic timer I.C. U5 and its internal components and circuitry which includes MOSFET fault current monitoring circuitry means for Q4.

With reference to FIGS. 2 and 3, the MOSFET fault current monitoring aspect of the system invention will now be described with reference to one digital logic timer means U5 and one electronic MOSFET output switching means Q4. Corresponding components U6 and Q3 are constructed and function in like fashion.

As shown, the control logic input of U5 is at pin 7, and this pin 7 input is protected from overvoltage by and with the integral zener diode connected between pin 7 and ground. The pin 7 input of digital logic timer U5 is connected to the non-inverting input (+) of comparator 10 and the response threshold level for pin 7 is set with the voltage reference connected to the inverting input (−) of that comparator. When the pin 7 input voltage is greater than the threshold, the output of comparator 10 enables AND gate 12, the output of which enables other integral operations of the circuit.

AND gate 12 enables the charge pump circuit 14, the current squaring circuit 18, and shuts off the gate voltage clamp circuit 30 which is connected to pin 4 output to the gate of Q4.

The charge pump circuit 14 charges and discharges integral capacitors to develop a proper gate voltage at pin 4.

MOSFET over current or fault current is monitored by measuring the drain to source voltage across the MOSFET Q4 as shown via its drain (DRN) and source (SRC) connections to U5. Pin 1 (SRC) connects Q4's source to the non-inverting input (+) of the voltage monitoring comparator 16 via circuit line 15. Pin 2 (DRN) connects Q4's drain through charge limiting resistor Rx to the inverting input (−) of voltage monitoring comparator 16 via circuit line 17, and to the emitter of PNP transistor T1, which has its base connected to the output of comparator 16 and which converts the comparator's output into a current toward the current squaring circuit 18.

Also connected to the current squaring circuit 18 are two comparators 19 and 20. These respective upper and lower level comparators compare the afore-mentioned integrated voltage to an upper and lower threshold limit, to which normal and proper operating currents are matched through the adjustment of $R_x$ and $R_t$. The upper level comparator 19, connected to the set input S of Flip-Flop 21 is compared to approximately four volts. The lower level comparator 20, connected to the Reset input R of the Flip-Flop 21 is compared to approximately one volt.

When the voltage at pin 8 (VT) reaches four volts, the Flip-Flop 21 Q output goes high and the $\bar{Q}$ output goes low. These activate the fault output at pin 6 via T2, and disable the AND gate 12 via circuit line 22, respectively. Since the AND gate 12 now disables the charge pump 14 and clamps the gate pin 4 "off", the Q4 FET current drops and the integrator voltage at pin 8 (VT) drops below the lower threshold. Now the Flip-Flop 21 reset R input is activated, and the Q and $\bar{Q}$ outputs reverse state, and the cycle may start again. The repetition rate is controlled by the time constant values of the integration filter circuit of $R_T$ and $C_T$, which components correspond to C5 (C5′) and R14 (R14′).

Now with reference to FIGS. 1 and 1A, the fault output at pin 6 of U5 provides an external control signal to control the operation of fault current indicator means 27 to provide an indication of a fault current condition of MOSFET output switch means Q4. The indication of a fault current condition may be via a light emitting diode or other visible indicating means, or via an audible means, neither of which are shown.

During a fault current condition, indicator 27 will directly indicate a fault status, and if the fault current is not due to a direct short from the external running lights HL to ground, the digital logic timer U5 controls the gate of MOSFET output switching means Q4 to intermittently flash the external running lights HL and/or PL to further provide a visible indication of a fault current condition. These external running lights are seen to flash at a visible rate of the self-resetting cycling circuit $R_T$ and $C_T$.

Accordingly, the system invention further provides an advantageous circuit component monitoring feature by providing a MOSFET fault current monitoring means within digital logic circuit timer U5 for monitoring the drain to source fault currents of MOSFET output switching means Q4, whereby upon detection of such fault currents, digital logic timer U5 controls fault current indicator 27 to provide in indication of a fault current condition of Q4 and, if the headlamps are operative and not shorted to ground, during a fault current condition, digital logic timer U5 controls the gate of MOSFET output switching means Q4 to intermittently flash the external running lights to further provide an indication of a fault current condition.

The digital logic timer component U5 or U6 provides at least two advantages: (1) produces desirable gate-source voltage; and (2) monitors drain-source current for safety shut down of a related MOSFET. The use of MOSFETs for switching high level direct currents is very desirable due to the low on-state resistance achievable between the source and drain terminals of the MOSFET. However, in order to obtain the lowest possible on-state resistance, a considerable voltage is required between the gate or control terminal and the source terminal of the MOSFET. The gate-source threshold voltage ($V_{GS}$) required to properly switch a MOSFET may be more than several volts, and considerable power will be dissipated in a high current MOSFET if it is not switched fully on. Due to the polarity of commonly available MOSFETs and the conventional requirement in the subject application of the invention to switch the positive lead of the load, the system invention connects the MOSFET source terminal to the output lamp load.

With reference set forth above as to FIG. 3, the digital logic timer incorporates a charge pump 14 which incorporates an oscillator to alternately charge and switch internal capacitors to produce the necessary and desirable gate-source voltage when U5 is activated via a control signal input at pin 7 thereof. The charge-pump circuit produces a gate-source voltage far greater than that required of the MOSFET; therefore, U5 or U6 insures that maximum available voltage reaches the load.

A second advantage offered by the utilization of U5 or U6 is that of safe current monitoring. When the drain to source path in the respective MOSFET is at a maximum conduction, as will be caused with adequate gate to source voltage, the drain to source voltage drop will be proportionately representative of the current flowing through the device. This characteristic allows the measurement of such voltage to indicate relative current through the device, where amperes of current flow may be represented as millivolts dropped across the MOSFET. The U5 or U6 circuit takes advantage of the natural voltage/current characteristic of the MOSFET by incorporating the before-mentioned drain to source volt current monitoring circuit, connected as shown in FIG. 3, which converts the very small VDS voltage to a pulse-width signal that is integrated in the filter circuit comprises of components $R_T$ and $C_T$, which filter is monitored with a threshold comparator that responds to voltages representative of fault currents. This integrating filter smooths the transients caused by the normal cold filament inrush current of incandescent external running light lamp loads. However, longer duration fault currents through the MOSFET will cause the integrator to develop a considerably higher voltage and subsequently reaching the comparator's preset threshold and shutting off the MOSFET by removing its gate voltage.

This completes the description as to that shown in FIGS. 2 and 3, which should enable any person skilled in the art to fully understand the operation of the above-described fault current monitoring circuitry means of the system invention.

The present invention system provides electrical component and circuit redundancy for all critical circuitry/components and, therefore, it would be highly infeasible for a circuit or component failure to result in a daytime running lighting system failure and resultant "lightsoff" condition.

Due to the redundant provision and combination of the digital logic timers U5, U6, also known as High Side Drivers, such require special design attention in their over current shutdown operation. The integrators, or self-resetting cycling circuits, $R_T$ and $C_T$, also referenced as C5/R14 and C5'/R14', are connected together at common connection 24 so that MOSFET electronic switching means shut-down is coordinated, and both MOSFETS Q4 and Q3 are always on or off simultaneously. Otherwise, during the occurrence of a fault condition, such condition could result in either individual MOSFET Q4 or Q3 carrying the entire fault current intermittently during the repeated and uncoordinated off cycle of the other MOSFET.

Redundant circuit means or circuit duplication provided for fail-safe backup requires that component failure modes as well as normal circuit operation cannot become mutually interfering or counteracting, in either electrical or thermal modes. Fault currents would naturally result in an excessive heating condition, and the High Side Drivers have the ability to detect and respond to fault currents before such heating becomes unmanageable.

Where each MOSFET is controlled by its own digital logic timer control circuit, as shown in both the FIGS. 1 and 1A and FIGS. 4 and 4A embodiments, each MOSFET may have its fault current managed to regulate fault-resultant heat within an acceptable limit. The aforementioned control principle utilizes a cycling technique whereby the OFF state period allows cooling of the MOSFET before again testing for the earlier detected fault current. The cycling process continues until the fault is cleared, or until the main power source is removed.

While circuit redundancy incorporates more than a single MOSFET, care must be exercised to prevent mutual heat build-up, particularly during a fault condition. During a current fault condition, the combined MOSFETs share the fault current. Since the management of fault currents requires that each MOSFET is cooled between cycling ON periods, the MOSFETs must be coordinated to avoid either one heating the other during its necessary cooling period.

Circuit coordination is accomplished when the partnering High Side Driver fault current timers are interconnected. This unique approach makes possible the redundant MOSFETs with an electronic means to manage thermal conditions that would otherwise result in a circuit failure. Without such circuit coordination, fault currents would lead to thermal failure as a result specifically due to the redundancy.

Each digital logic timer U5, U6 has protective resistance R17/R16 and R20/R19, respectively, included between its respective gate and source connections to and with the respective MOSFET gate and source connections of Q4 and Q3. These resistances respectively protect each digital logic timer circuit when transients occur on the external connections. Each MOSFET gate is transient protected through a coupling diode CR11 or CR10 to a common clamping zener diode VR1.

A further safety precaution is incorporated in the system invention to avoid MOSFET failure in the event of a lost ground connection. With reference to FIGS. 1 and 1A, note diode CR12 cathode connection to MOSFET source output, the anode of CR12 being connected to ground. This diode provides an electrical reference to ground through the external running lights load if the system ground connection is lost, not to maintain operation, but to prevent circuit failure. Without this diode component connection, a lost ground connection will ordinarily destroy either MOSFET Q4, Q3 because the digital logic circuit U5 or U6 cannot develop full voltage potential to properly saturate the respective Q4 or Q3 gate.

Figure 4:
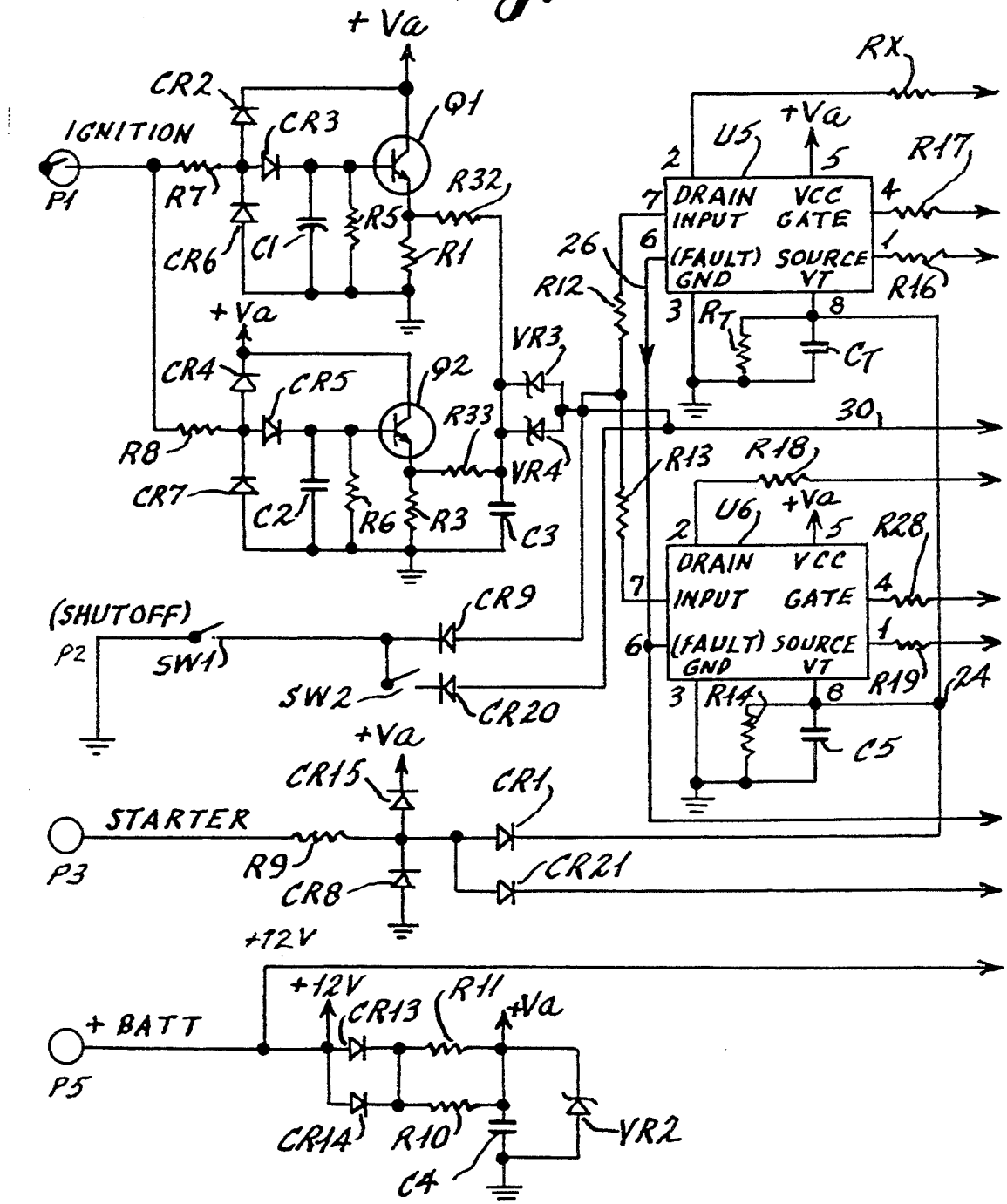
FIG. 4 and 4A is a combined schematic and block diagram of a preferred embodiment of the system invention which incorporates most of the system components of that shown in FIG. 1 and 1A and additional circuitry components U1, U2, Q5 and Q6, wherein U5/Q4 and U6/Q3 are connected in parallel with each other for controlling only the headlights HL, and U1/Q5 and U2/Q6 are connected in parallel with each other for controlling only the parking lights PL.
Figure 4A:
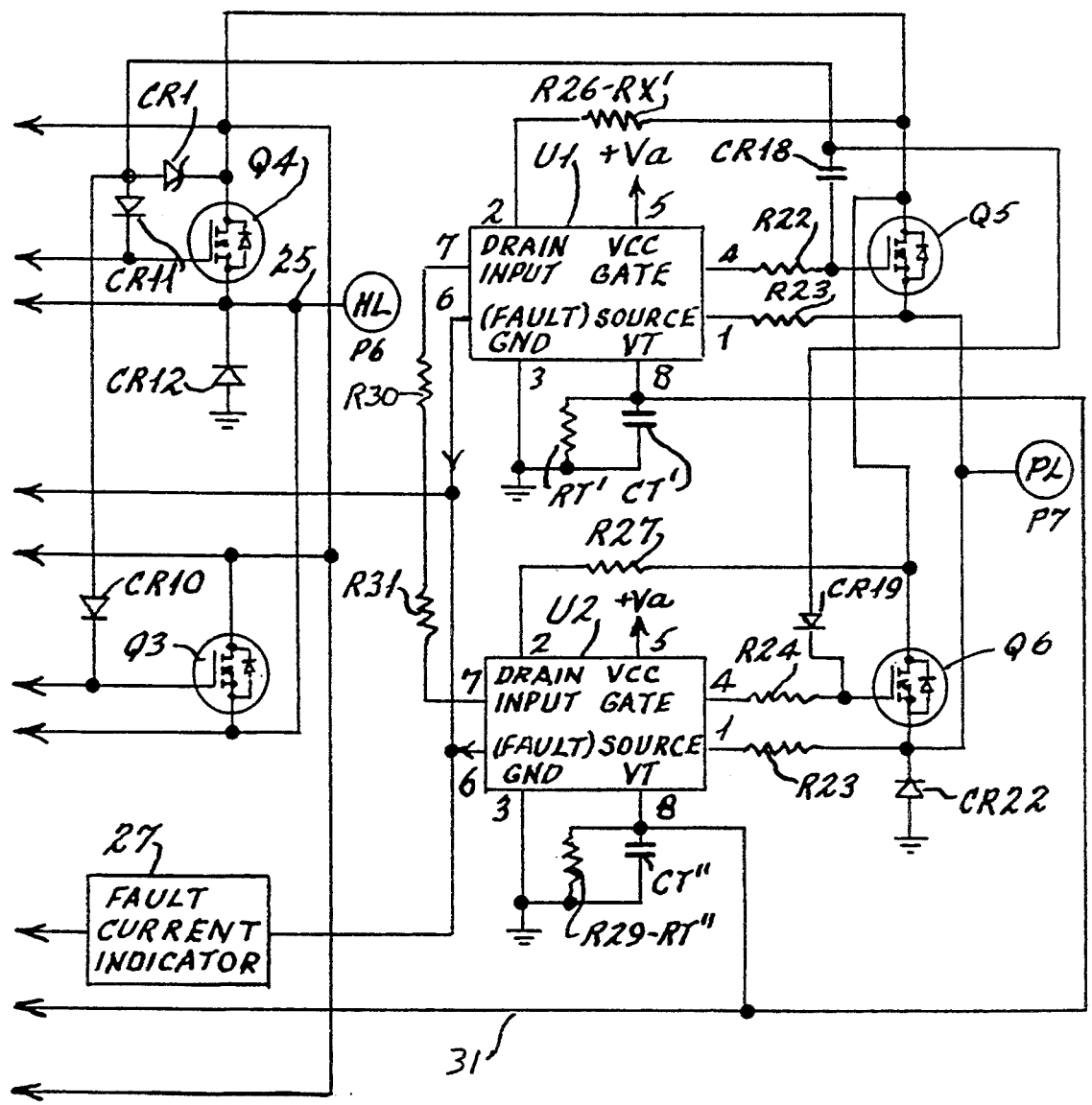

A preferred embodiment of the system invention is shown in FIGS. 4 and 4A, which incorporates most of the system components of that shown in FIGS. 1 and 1A, and additional circuitry components U1, U2, Q5 and Q6, wherein U5/Q4 and U6/Q3 are connected in parallel with each other for controlling only the headlights HL, and U1/Q5 and U2/Q6 are connected in parallel with each other for controlling only the parking lights PL. The circuit components depicted in FIGS. 1 and 1A which are incorporated into the system circuitry of FIGS. 4 and 4A have been provided with like component designations for ease of understanding and for the sake of brevity. The diode components CR16 and CR17 shown in FIGS. 1A have been deleted, since as set forth hereinabove, the headlights HL and the parking lights PL are separately controlled via the circuit operations of U5/Q4 and U6/Q3, and U1/Q5 and U2/Q6, respectively. It is to be understood that an understanding of the system operation of FIG. 4 and 4A can be had by reference to FIGS. 2 and 3, except for the fact that FIGS. 2 and 3 depict the headlights and parking lights loads being controlled together or simultaneously, while as clearly shown in FIGS. 4 and 4A, and as set forth above, the headlights HL and the parking lights PL are controlled separately. For the sake of brevity, additional drawing Figures similar to that of FIGS. 2 and 3, but showing separately controlling the headlights and the parking lights, have not been provided, and further in view of the fact that one of ordinary skill in the art to which the invention pertains could fully understand the operation of the system invention depicted in FIGS. 4 and 4A without any additional Figure drawings similar to that of FIGS. 2 and 3. It is readily apparent that FIGS. 4 and 4A differs from FIGS. 1 and 1A as follows: zener diodes VR3 and VR4 connected in parallel with each other and connected between trigger timer circuit means Q1/Q2 and input pin 7 of both U5 and U6 and U1 and U2, the digital logic timer means for electronic MOSFET output switching means Q4/Q3 and Q5/Q6, respectively; CR20 functions like CR9 to couple the ground connection upon actuation of switches SW1 and SW2 to shunt the voltage at the junction of resistors R12/R13 and R30/R31, and thus turn off U5, U6, U1 and U2 to accomplish the SHUTOFF feature of the invention; diode CR21 functions like diode CR1 to couple the starter motor circuit from input P3 to the VT input of U1 and U2; the fault output pin 6 of each digital logic timer U5, U6, U1 and U2 is connected to fault current indicator means 27; U5 and Q4 connected in parallel with redundant circuit means U6 and Q3 are connected together to control the activation of only the headlights HL; and, U1 and Q5 are connected in parallel with second redundant component circuit means U2 and Q6 and are connected together to automatically control, separately from the headlights, the activation of the parking lights PL.

FIGS. 4 and 4A depicts a preferred embodiment of the system invention, wherein, as set forth above, activation and deactivation of the headlights and parking lights are separately controlled by the above-identified circuit components and their respective interconnections. The FIGS. 4 and 4A embodiment is considered to be a preferred "best-mode" embodiment, since it incorporates separate and redundant component circuit means for controlling the operation of the headlights and parking lights of the automatic daytime running light system invention to thereby provide a higher level of reliability and fail-safe operation than that provided by the embodiment shown in FIGS. 1 and 1A.

The preferred embodiment of FIGS. 4 and 4A, like that shown in FIG. 1, provides fault current indicator 27 which is connected for operation via pin 6 of each digital logic timer device U5, U6, U1 and U2, each of which operate in like fashion as that set forth for U5 and U6 in the foregoing description as to FIGS. 1 and 1A.

With reference to the "SHUTOFF" feature, its input circuit includes switches SW1 and SW2, and diodes CR9 and CR20. As shown in FIGS. 4 and 4A, CR9 is connected in series with SW1 between P2 (ground) and pin 7 of U5 and U6 via R12 and R13, respectively. SW2 and CR20 are connected in series with each other and in parallel with SW1 and CR9, and are further connected between P2 (ground), via circuit line 30, to input 7 of both U1 and U2 via R30 and R31, respectively. The manual switch means SW1 and SW2 operate in the following manner. When SW1 is closed and SW2 is open, a ground connection is coupled to pin 7 of U5 and U6 to turn them off and thereby disable the headlight control circuit and extinguish the headlights. When SW1 is closed and SW2 is closed, a ground connection is further coupled to pin 7 of U1 and U6 to turn them off, and thereby the parking light control circuit is disabled and the parking lights are extinguished. The shutoff feature of FIGS. 4 and 4A is provided for military and public service/utility applications, which may require that the vehicle engine remain in a running condition without activation or energization of either the headlights or the parking lights. FIGS. 4 and 4A also incorporates the feature provided in FIGS. 1 and 1A relative to the vehicle starter motor circuit, and further includes diode CR21 connected in parallel with diode CR1. A positive voltage greater than +5 volts at the starter input P3 activates the fault current circuitry feature of each digital logic timer U5, U6, U1 and U2 and forces it to turn off. The +5 volt signal is coupled to pin 8 of both U1 and U2 via circuit line 31 from CR21. Thus, neither the headlights nor parking lights are energized during starter motor activity.

The digital logic timers or High Side Drivers and their respective MOSFET output switching devices are powered from both the regulated, filtered and limited power supply comprising CR13, CR14, R10, R11, C4 and VR2 and the positive twelve volt side of the vehicle battery.

In view of the foregoing invention system disclosure, it is apparent that the present invention can be retrofitted to other than new vehicles, i.e., vehicles already in service.

Although the present invention has been described hereinabove by way of a preferred embodiment thereof, it should be pointed out that such preferred embodiment may be modified at will, within the scope of the appended claims, without changing or altering the scope and nature of the present invention, which claims are defined as follows.

We claim:

1. An automatic daytime running light system for a vehicle having an engine, an electric power source, a starter motor circuit for the engine, external running lights including headlights and parking lights, an ignition switch, the system being responsive to the ignition switch and starter motor circuit to automatically control the operation of the external running lights, the system comprising in combination:

a first digital logic timer means having an input and outputs, circuit means connecting said input of said first digital logic timer means to the ignition switch for automatically controlling the operation of the external running lights to activate such lights in response to the ignition switch being ON; and a first MOSFET output switching means, said circuit means connecting said switching means to the external running lights and to said digital logic timer means; whereby said digital logic timer means and said MOSFET output switching provide a high level of reliability and safety to control the operation of the external running lights.

2. The automatic daytime running light system of claim 1, wherein said first digital logic timer means is connected with the starter motor circuit and operative to control deactivation of the external running lights when the starter motor is activated.

3. The automatic daytime running light system of claim 1, further including a first trigger timer circuit means connected between the ignition switch and said first digital logic timer means to provide an input control signal to said first digital logic timer means.

4. The automatic daytime running light system of claim 3, further including redundant circuit means connected between the ignition switch and the external running lights, and in parallel with said first trigger timer circuit means and said first digital logic timer means and said first MOSFET output switching means, to thereby insure that any failure will not cause system inoperativeness and to thereby provide a high level of reliability and fail-safe operation in the system.

5. The automatic daytime running light system of claim 4, wherein said redundant circuit means includes a second trigger timer circuit means, a second digital logic timer means, and second MOSFET output switching means interconnected in the system, and wherein either of said first and second trigger timer circuit means provides an input control signal to either of said first and second digital logic timer means, and either of said first and second digital logic timer means being connected control either of said first and second MOSFET output switching means, for automatically controlling the operation of the external running lights.

6. The automatic daytime running light system of claim 1, further including:

fault current indicator means controlled by said first digital logic timer means;

said first digital logic timer means including MOSFET fault current monitoring means for monitoring drain to source fault currents of said first MOSFET output switching means, whereby upon detection of fault currents, said first digital logic timer means controls said fault current indicator means to provide an indication of a fault current condition.

7. The automatic daytime running light system of claim 6, wherein upon detection of the fault currents, said first digital logic timer means controls a gate of said first MOSFET output switching means to intermittently flash the external running lights to further provide an indication of a fault current condition.

8. The automatic daytime running light system of claim 1, further including manual switch means connected between a ground and said input of said first digital logic timer circuit means and actuated by an operator of the vehicle to disable the operation of said system and extinguish the external running lights.

9. The automatic daytime running light system of claim 4, further including:

fault current indicator means controlled by said first digital logic timer means;

said first digital logic timer means including a MOSFET fault current monitoring means for monitoring drain to source fault currents of said first MOSFET output switching means, whereby upon detection of the fault currents, said first digital logic timer means controls said fault current indicator means to provide an indication of a fault current condition.

10. The automatic daytime running light system of claim 9, wherein upon detection of the fault currents, said first digital logic timer means controls a gate of said first MOSFET output switching means to intermittently flash the external running lights to further provide an indication of a fault current condition.

11. The automatic daytime running light system of claim 5, further including:

fault current indicator means controlled by said first and second digital logic timer means;

each of said first and second digital logic timer means including a MOSFET fault current monitoring means for monitoring drain to source fault currents of said first and second MOSFET output switching means, respectively, whereby upon detection of the fault currents, one of said first and second digital logic timer means controls said fault current indicator means to provide an indication of a fault current condition.

12. The automatic daytime running light system of claim 11, wherein upon detection of the fault currents, either of said first and second digital logic timer means controls a gate of said first and second MOSFET output switching means, respectively, to intermittently flash the external running lights to further provide an indication of a fault current condition.

13. A method of operating an automatic daytime running light system for a motor vehicle having an engine, an electric power source, an ignition circuit, a starter motor circuit, and external running lights including headlights and parking lights, said method comprising the steps of:

controlling the operation of the external running lights by automatically activating the external running lights in response to ignition circuit activation;

providing in the system digital logic timer and electronic MOSFET output switching devices connected between the ignition circuit and the external running lights;

automatically supplying power from the electric power source to and from the external running lights via the electronic MOSFET output switching device, and controlling the activation of the output switching device via the digital logic timer, thereby providing a high level of reliability and safety;

monitoring the occurrence of drain to source fault currents of the electronic MOSFET output switching device; and indicating the occurrence of such fault currents via visual or audible indications.

14. The method of claim 13, further including the step of providing redundant component circuit means in the daytime running light system between the ignition circuit and the external running lights and in parallel with the digital logic timer and the electronic MOSFET output switching device, thereby insuring fail-safe operation of the system.

15. The automatic daytime running light system of claim 5, wherein said first and second trigger timer circuit means and said first and second digital logic timer means, and said first and second MOSFET output switching means are connected in the system for automatically controlling the actuation of the headlights only; and, further including a third digital logic timer means connected between said first trigger timer circuit means and a third MOSFET output switching means, a fourth digital logic timer means connected between said second trigger timer circuit means and a fourth MOSFET output switching means, and wherein said fourth digital logic timer means and said fourth MOSFET output switching means are connected in parallel with said third digital logic timer means and said third MOSFET output switching means and between said first and second trigger timer circuit means and the parking lights in the system for automatically controlling the activation of the parking lights only.

16. The automatic daytime running light system of claim 15, further including:
fault current indicator means connected to and controlled by each of said first, second, third and fourth digital logic timer means; and
each of said first, second, third and fourth digital logic timer means including MOSFET fault current monitoring means for monitoring drain to source fault currents of each respectively controlled first, second, third and fourth MOSFET output switching means, whereby upon detection of fault currents, at least one of said first, second, third or fourth digital logic timer means detecting the fault currents controls said fault current indicator means to provide an indication of a fault current condition.

17. The automatic daytime running light system of claim 16, further including manual switch means connected between a ground and each of said first, second, third and fourth digital logic timer means and actuated by an operator of the vehicle to disable the operation of the system and extinguish the headlights and parking lights.

18. The method of claim 14, further including the steps of:
connecting said digital logic timer and electronic MOSFET output switching devices and said redundant component circuit in the system with the headlights, and controlling the activation of only the headlights, and providing a second digital logic timer and a second MOSFET output switching device and a second redundant component circuit in the system and controlling the activation of only the parking lights.

19. An automatic daytime running light system for a vehicle having an engine, an electric power source, a starter motor circuit, external running lights including headlights and parking lights, an ignition switch, the system being responsive to the ignition switch and starter motor circuit to automatically control the operation of the external running lights, the system comprising:
a first digital logic timer means having an input and output for automatically controlling the operation of the external running lights to activate such lights in response to the ignition switch being ON;
a first MOSFET output switching means connected between the external running lights and to said output of said first digital logic timer means;
a manual switch means connected between a ground and said input of said first digital logic timer means and being operable to disable the operation of the system and extinguish the external running lights; whereby said first digital logic timer means and said first MOSFET output switching means are operable to control the external running lights unless said manual switch means is closed to ground.

20. The automatic daytime running light system of claim 19 including a second digital logic timer means having an input and an output for automatically controlling the operation of the external running lights to activate such lights in response to the ignition switch being ON and a second MOSFET output switching means interconnected between said output of said second digital logic timer means and the external running lights.

21. An automatic daytime running light system for a vehicle having an engine, an electric power source, a starter motor circuit, external running lights including headlights and parking lights, an ignition switch, the system being responsive to the ignition switch and starter motor circuit to automatically control the operation of the external running lights, the system comprising:
first and second digital logic timer means having an input and output for automatically controlling the operation of the external running lights to activate such lights in response to the ignition switch being ON;
first and second MOSFET output switching means connected between the external running lights and to said output of said first and second digital logic timer means, respectively;
whereby said first digital logic timer means and said first MOSFET output switching means and said second digital logic timer means and said second MOSFET output switching means are both connected between said ignition switch and the external running lights for activating the external running lights in response to the ignition switch being ON.

22. The automatic daytime running light system of claim 21 including a first trigger timer circuit means connected between the ignition switch and said first digital logic timer means to provide an input control signal to said first digital logic timer means and a second trigger timer circuit means connected between the ignition switch and said second digital logic timer means to provide an input control signal to said second digital logic timer means.

23. The automatic daytime running light system of claim 22 wherein first and second trigger timer circuit means and said first and second digital logic timer means and said first and second MOSFET output switching means are connected in the system for automatically controlling the actuation of the headlights only; and, further including a third digital logic timer means connected between said first trigger timer circuit means and a third MOSFET output switching means, a fourth digital logic timer means connected between said second trigger timer circuit means and a fourth MOSFET output switching means, wherein said fourth digital logic timer means and said fourth MOSFET output switching means are connected in parallel with said third digital logic timer means and said third MOSFET output switching means and between said first and second trigger timer circuit means and the parking lights in the system for automatically controlling the activation of the parking lights only.

24. The automatic daytime running light system of claim 21 wherein said first and second digital logic timer means and said first and second MOSFET output switching means are connected in the system for automatically controlling the actuation of the headlights only; and, further including a third digital logic timer means connected between the ignition switch and a third MOSFET output switching means, a fourth digital logic timer means connected between the ignition switch and a fourth MOSFET output switching means, wherein said fourth digital logic timer means and said fourth MOSFET output switching means are connected in parallel with said third digital logic timer means and said third MOSFET output switching means and between said ignition switch and the parking lights in the system for automatically controlling the activation of the parking lights only.

* * * * *